(12) United States Patent
Pulici

(10) Patent No.: US 10,179,440 B2
(45) Date of Patent: Jan. 15, 2019

(54) METHOD AND APPARATUS FOR FEEDING A PLURALITY OF TREAD BANDS IN A PROCESS FOR BUILDING TYRES FOR VEHICLE WHEELS

(71) Applicant: PIRELLI TYRE S.P.A., Milan (IT)

(72) Inventor: Lorenzo Pulici, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 14/906,690

(22) PCT Filed: Jul. 30, 2014

(86) PCT No.: PCT/IB2014/063552
§ 371 (c)(1),
(2) Date: Jan. 21, 2016

(87) PCT Pub. No.: WO2015/015439
PCT Pub. Date: Feb. 5, 2015

(65) Prior Publication Data
US 2016/0159021 A1    Jun. 9, 2016

(30) Foreign Application Priority Data
Jul. 31, 2013 (IT) .............................. MI2013A1281

(51) Int. Cl.
*B29D 30/30* (2006.01)
*B29D 30/58* (2006.01)
(Continued)

(52) U.S. Cl.
CPC ............ *B29D 30/005* (2013.01); *B29C 31/08* (2013.01); *B29D 30/0016* (2013.01);
(Continued)

(58) Field of Classification Search
CPC ........ B29D 30/0016; B29D 2030/0022; B29D 2030/0038; B29D 30/26; B29D 30/30; B29D 30/58
See application file for complete search history.

(56) References Cited

U.S. PATENT DOCUMENTS 2,536,756 A * 1/1951 Lopez ...................... A21B 3/07
                                                                198/347.3
3,795,563 A * 3/1974 Enders ............... B29D 30/3007
                                                                 156/111
(Continued)

FOREIGN PATENT DOCUMENTS

CN          101232983 A      7/2008
DE      102008037611      *  6/2010 ............. B29D 30/48
(Continued)

OTHER PUBLICATIONS

Machine generated English language translation of JP 2000-118632 (orginal document dated Apr. 2000).*
(Continued)

*Primary Examiner* — Martin K Rogers
(74) *Attorney, Agent, or Firm* — Finnegan, Henderson, Farabow, Garrett & Dunner, L.L.P.

(57) ABSTRACT

A method and apparatus for feeding a plurality of tread bands in a process for building tires for vehicle wheels. Each tread band initially includes, on a side thereof, a service fabric. The tread bands are initially arranged at different heights. The method includes positioning a first auxiliary conveyor belt of an auxiliary collection device including a plurality of juxtaposed auxiliary conveyor belts at a first height corresponding to the height of a first tread band, then, proceeding with the removal of the service fabric from the first tread band while the first tread band is transferred onto the first auxiliary conveyor belt. The method also includes positioning at least one second auxiliary conveyor belt of the
(Continued)

auxiliary collection device at at least one second height corresponding to that of at least one second tread band.

11 Claims, 4 Drawing Sheets

(51) Int. Cl.
*B29D 30/00* (2006.01)
*B29C 31/08* (2006.01)
*B65G 65/00* (2006.01)
*B65G 47/51* (2006.01)
B65G 47/64 (2006.01)
B29K 105/00 (2006.01)

(52) U.S. Cl.
CPC ......... *B65G 47/5104* (2013.01); *B65G 65/00* (2013.01); *B29D 30/30* (2013.01); *B29D 30/58* (2013.01); *B29D 2030/0038* (2013.01); *B29K 2105/253* (2013.01); *B65G 47/643* (2013.01)

(56) References Cited

U.S. PATENT DOCUMENTS

| | | | | |
|---|---|---|---|---|
| 4,232,987 | A * | 11/1980 | Giordano | B65G 65/00 198/780 |
| 4,284,187 | A * | 8/1981 | Kramer | B65G 47/5186 198/435 |
| 4,538,363 | A * | 9/1985 | Zagoroff | F26B 25/008 34/225 |
| 4,808,257 | A * | 2/1989 | Rex | B29C 66/81461 156/413 |
| 4,838,137 | A * | 6/1989 | Azuma | B29D 30/46 156/406 |
| 4,867,299 | A * | 9/1989 | Fukuoka | B65G 47/643 198/435 |
| 4,875,959 | A * | 10/1989 | Kumagai | B29D 30/42 156/123 |
| 5,725,703 | A | 3/1998 | Gerloff | |
| 6,355,136 | B1 * | 3/2002 | Currie | B29D 30/3007 156/128.1 |
| 6,416,013 | B1 | 7/2002 | Benzing, II | |
| 7,946,797 | B2 * | 5/2011 | Smith | A01K 31/165 198/435 |
| 8,236,228 | B2 | 8/2012 | Papin et al. | |
| 8,308,468 | B2 | 11/2012 | Papin et al. | |
| 2006/0283556 | A1 * | 12/2006 | Tiengo | B29D 30/44 156/750 |
| 2007/0023963 | A1 | 2/2007 | Papin et al. | |
| 2007/0175567 | A1 * | 8/2007 | Stahl | B29D 30/20 156/111 |
| 2008/0073020 | A1 * | 3/2008 | Lammlein | B26D 3/003 156/110.1 |
| 2012/0125519 | A1 * | 5/2012 | Grolleman | B29D 30/14 156/64 |
| 2012/0177764 | A1 | 7/2012 | Papin et al. | |
| 2012/0248651 | A1 | 10/2012 | Conti et al. | |

FOREIGN PATENT DOCUMENTS

| | | | | |
|---|---|---|---|---|
| EP | 1 188 700 | | 3/2002 | |
| JP | 02-66020 | * | 3/1990 | ............. B65G 47/64 |
| JP | 2000-33656 | * | 2/2000 | ............. B29D 30/30 |
| JP | 2000-118632 | * | 4/2000 | ............. B65G 1/06 |
| JP | 2002-11807 | | 1/2002 | |
| RU | 2311331 | C2 | 11/2007 | |
| SU | 203201 | A1 | 1/1967 | |
| SU | 1431666 | A3 | 10/1988 | |
| WO | WO 98/31621 | | 7/1998 | |
| WO | WO 2011/073795 | | 6/2011 | |
| WO | WO 2013/061233 | * | 5/2013 | ............. B29D 30/46 |

OTHER PUBLICATIONS

Machine generated English language translation of JP 2000-33656 (original document dated Feb. 2000).*
Machine generated English language translation of DE 102008037611 (original document dated Jun. 2010).*
Machine generated English language translation of JP 02-66020 (original document dated Mar. 1990).*
International Search Report from the European Patent Office for International Application No. PCT/IB2014/063552, dated Nov. 5, 2014.
Written Opinion of the International Searching Authority from the European Patent Office for International Application No. PCT/IB2014/063552, dated Nov. 5, 2014.
Office Action from State Intellecutal Property Office of the People's Republic of China for related patent application No. 201480041497.X, dated Feb. 4, 2017 (23 pages, including translation).
Notification of the Third Office Action from the State Intellectual Property Office of the People's Republic of China in a counterpart application No. 201480041497.X, dated Dec. 1, 2017.
Decision to Grant from The Federal Service for Intellectual Property in a counterpart Russian Application No. 2016105614/05, dated Apr. 13, 2018.
Notification of the Fourth Office Action from The State Intellectual Property Office of the People's Republic of China in a counterpart application No. 201480041497.X, dated Mar. 2, 2018.
Lin Lidui, Tire Production Technology, pp. 145-148, Chemical Industry Press, Apr. 2008.

* cited by examiner

METHOD AND APPARATUS FOR FEEDING A PLURALITY OF TREAD BANDS IN A PROCESS FOR BUILDING TYRES FOR VEHICLE WHEELS

CROSS REFERENCE TO RELATED APPLICATIONS

This application is a national phase application based on PCT/IB2014/063552, filed Jul. 30, 2014, and claims the priority of Italian Patent Application No. MI2013A001281, filed Jul. 31, 2013, the content of both applications being incorporated herein by reference.

BACKGROUND OF THE INVENTION

Field of the Invention

The present invention relates to a method and an apparatus for feeding a plurality of tread bands in a process for building tyres for vehicle wheels.

DESCRIPTION OF THE RELATED ART

The method and apparatus of the invention are preferably used for building tyres for four-wheeled heavy load vehicle wheels (like lorries, trucks, tractors, articulated lorries, buses, trailers, and other vehicles of this type). Such vehicles in particular belong to categories M2~M3, N2~N3 and O2~O4 defined in "Consolidate Resolution of the Construction of Vehicles (R.E.3) (1997)", Annex 7, pages 52-59, "Classification and definition of power-driven vehicles and trailers".

Hereafter, the term "elastomeric material" is used to indicate a composition comprising at least one elastomeric polymer and at least one reinforcing filler. Preferably, such a composition also comprises additives like, for example, a cross-linking agent and/or a plasticizer. Thanks to the presence of the cross-linking agent, such a material can be cross-linked through heating, so as to form the end product.

The terms "radial" and "axial" and the expressions "radially inner/outer" and "axially inner/outer" are used with reference to the radial direction and to the axial direction of a forming support used to build one or more components of the tyre. The terms "circumferential" and "circumferentially", on the other hand, are used with reference to the annular extension of the aforementioned forming support.

By "side" of a tread band it is intended to indicate the surface that is located in a radially inner position once the tread band itself is wound on a forming drum.

A tyre for vehicle wheels generally comprises a carcass structure comprising at least one carcass ply formed from reinforcing cords incorporated in a matrix of elastomeric material. The carcass ply has end edges respectively engaged with annular anchoring structures. The latter are arranged in the areas of the tyre usually identified with the name "beads" and each of them is normally formed by a substantially circumferential annular insert on which at least one filling insert is applied, in a radially outer position thereof. Such annular inserts are commonly identified as "bead cores" and they have the task of keeping the tyre firmly fixed to the anchoring seat specifically provided in the rim of the wheel, thus preventing, in operation, the radially inner end edge of the tyre from coming out from such a seat.

Specific reinforcing structures having the function of improving the torque transmission to the tyre can be provided at the beads.

A crown structure is associated in a radially outer position with respect to the carcass ply, the crown structure comprising a belt structure and, in a radially outer position with respect to the belt structure, a tread band.

The belt structure comprises one or more belt layers arranged radially one on top of the other and having textile or metallic reinforcing cords with a crossed orientation and/or an orientation substantially parallel to the direction of circumferential extension of the tyre.

A layer of elastomeric material, called "under-belt", can be provided between the carcass structure and the belt structure, said layer having the function of making the radially outer surface of the carcass structure as uniform as possible for the subsequent application of the belt structure.

The tread band is made of elastomeric material too.

A so-called "under-layer" made of elastomeric material can be arranged between the tread band and the belt structure, the under-layer having properties suitable for ensuring a steady union of the tread band to the belt structure.

On the side surfaces of the carcass structure, each extending from one of the side edges of the tread band up to the respective annular anchoring structure to the beads, respective sidewalls of elastomeric material are applied.

With particular reference to the tread band, after it has been made, it is generally stored together with a plurality of other tread bands in a suitable storage device, from which it is later picked up to be deposited on a forming support.

EP 0 448 407 describes a method for producing tyres of different sizes, in which components of the tyre, including tread bands, are arranged on three distinct collection and feeding devices. A selective mechanism each time selects one of the aforementioned collection and feeding devices to allow the respective components to be fed to a building drum.

U.S. Pat. No. 5,725,703 describes a method for depositing a predetermined piece of a tread strip on a belt building drum. Portions of tread strips are cut from a continuous tread strip and are collected in a collection device, from which they are sequentially fed to the building drum along a feeding direction jointing the tail portion of one strip with the head portion of a subsequent strip, thus forming an almost continuous tread band, which is cut to the required length so as to correspond to the circumference of the building drum.

WO 98/31621 describes an apparatus and a method for removing a non-vulcanized tread band from a collection device. The tread band is picked up through a bar provided with a plurality of suction cups. Each suction cup can be fed selectively for the creation of the vacuum as a function of the length of the tread band. After the suction cups have engaged the tread band, the band is lifted from the collection device, turned over by 180° and arranged on a roller conveyor.

SUMMARY OF THE INVENTION

The Applicant has observed that in order to achieve a stable coupling between tread band and belt structure it is necessary to preserve and protect the adhesiveness of the side of the tread band intended to be associated with the belt structure. For this purpose, a service fabric is applied by adhesion on the aforementioned side. Such a service fabric must be removed before proceeding with the depositing of the tread band on the forming support.

The Applicant has noted that, due to the strong adhesion of the service fabric to the tread band, the manual removal operations of the service fabric require a high physical effort for the operator in charge of this task. Such a operator is also required to make an equally high physical effort to pick up the tread band from the storage device and transfer it to the feeding device for feeding it to the forming support. Indeed, it should be considered that the tread bands for heavy load vehicles can weigh more than 35 kg and be more than 3.5 meters long.

The Applicant has also noted that the physical effort that the operator is subjected to is further increased by the high speed and frequency with which he must perform the aforementioned operations of removal of the service fabric from the tread band and of transferring the tread band to the aforementioned feeding device. This is due to the constant need to have cycle times that are as short as possible in order to increase productivity.

After all, the Applicant has verified that, with cycle times of the order for example of a few minutes, the aforementioned operations of removal of the service fabric from the tread band and of transferring the tread band to the feeding device, as well as being particularly tiring for the operator, almost totally occupy all the operator's time, thus preventing him from performing other operations, like for example the preparation of other materials to make other tread bands or to build other components of the tyre.

The Applicant has realised that it is possible to substantially reduce the workload of the operator and at the same time maintain extremely short cycle times, ensuring that the operations of removal of the service fabric and transferring of the tread band to the feeding device are both carried out almost entirely automatically, i.e. with a minimal intervention, both in terms of physical effort and in terms of time, by the operator.

The Applicant has also realised that the almost total automation of the aforementioned operations makes it possible to concentrate in a single production step the execution of such operations for a plurality of tread bands, thus leaving the operator a period of "free time" that is sufficiently long to allow him to dedicate himself to other operations.

The Applicant has nevertheless observed that the concentration in a single production step of the operations of removal of the service fabric and transferring of the tread band to the feeding device necessarily requires the provision, downstream of the station in which the removal of the service fabric is carried out, of an auxiliary collection device for collecting all of the tread bands without the service fabric. Such an auxiliary collection device must be capable of collecting all of the tread bands from which the service fabric is removed to then transfer them individually and in series to the forming support.

The Applicant has, however, noted that the provision of the aforementioned auxiliary collection device inevitably involves an increase in the floor bulk of the building apparatus, with consequent problems of layout and plant cost.

The Applicant has thus felt the need to reduce to the minimum the floor bulk of the aforementioned auxiliary collection device, whilst still safeguarding the accessibility for the operator, without such a reduction in bulk involving a corresponding limitation in the number of tread bands that such an auxiliary collection device is capable of collecting in the aforementioned single production step.

The Applicant has finally found that it is possible to satisfy the aforementioned requirement of low bulk without any limitation on the number of tread bands and in terms of accessibility making an auxiliary collection device comprising a plurality of juxtaposed auxiliary conveyor belts movable along the vertical direction. In this way, the provision of many juxtaposed auxiliary conveyor belts allows, for the same bulk in plan, to collect multiple tread bands. The vertical movement of the belts also allows to bring each belt to a height in which it is easily accessible by the operator. The use of belts also allows to automatically transfer the individual tread bands to the forming support, thus without the need for intervention by the operator. It is thus possible, after all, to reduce the workload of the operator and allow him to dedicate himself to other operations, respecting extremely short cycle times and without excessive worsening in terms of bulk and layout.

The present invention therefore relates, in a first aspect thereof, to a method for feeding a plurality of tread bands in a process for building tyres for vehicle wheels.

Preferably, a plurality of tread bands is provided at different heights, each tread band comprising, on a side thereof, a service fabric.

Preferably, a first auxiliary conveyor belt of an auxiliary collection device is positioned at a first height corresponding to that of a first tread band of said plurality of tread bands.

Preferably, said auxiliary collection device comprises a plurality of juxtaposed auxiliary conveyor belts.

Preferably, said service fabric is removed from said first tread band while said first tread band is transferred onto said first auxiliary conveyor belt.

Preferably, at least one second auxiliary conveyor belt of said auxiliary collection device is positioned at at least one second height corresponding to that of at least one second tread band of said plurality of tread bands.

Preferably, said service fabric is removed from said at least one second tread band while said at least one second tread band is transferred onto said at least one second auxiliary conveyor belt.

Preferably, said first tread band and said at least one second tread band are moved in sequence from said first auxiliary conveyor belt and from said at least one second auxiliary conveyor belt, respectively, towards a forming support.

The Applicant believes that in this way it is possible to remove the service fabric from a plurality of tread bands and transfer such tread bands towards the forming support in extremely short cycle times and without any physical effort from the operator, moreover leaving the operator "free time" to dedicate to other operations. All of this without excessive worsening in terms of bulk and layout.

In a second aspect thereof, the invention relates to an apparatus for feeding a plurality of tread bands in a process for building tyres for vehicle wheels.

Preferably, the apparatus comprises a storage device for storing a plurality of tread bands at different heights, each tread band comprising, on a side thereof, a service fabric.

Preferably, the apparatus comprises a separation device for separating said service fabric from each of said tread bands.

Preferably, the apparatus comprises an auxiliary collection device for collecting each of said plurality of tread bands on a respective auxiliary conveyor belt.

Preferably, said auxiliary collection device comprises a plurality of juxtaposed auxiliary conveyor belts and can be controlled to position each of said auxiliary conveyor belts at a respective height depending on the height of a respective tread band of said plurality of tread bands.

Preferably, the apparatus comprises a feeding device for feeding each of said tread bands to a forming support.

The Applicant considers that such an apparatus makes it possible to achieve the technical effects discussed above.

The present invention, in at least one of the aforementioned aspects, can have at least one of the following preferred characteristics, taken individually or in combination.

Preferably, positioning said first auxiliary conveyor belt comprises:
- positioning at said first height a work plane of a separation device for separating said service fabric;
- positioning said first auxiliary conveyor belt at a height substantially equal to said first height.

More preferably, removing said service fabric from said first tread band comprises:
- detaching said service fabric from a free end portion of a head portion of said first tread band to form a detached end edge of said service fabric;
- transferring said head portion onto said work plane;
- completing the detachment of said service fabric from said first tread band while said first tread band is transferred from said work plane onto said first auxiliary conveyor belt.

The manual intervention of the operator is thus extremely limited, consisting only in the removal of the service fabric from a limited part of the tread band and in transferring a head portion from the tread band onto the work plane. The operator therefore, in addition to have a reduced physical burden, can advantageously dedicate himself to other operations.

In preferred embodiments, completing the detachment of said service fabric from said first tread band comprises:
- transferring said head portion from said work plane onto said first auxiliary conveyor belt due to the pulling action of said detached end edge;
- moving said first auxiliary conveyor belt;
- detaching said service fabric due to the movement of said first auxiliary conveyor belt.

Preferably, positioning said at least one second auxiliary conveyor belt comprises:
- positioning said work plane at said at least one second height;
- positioning said at least one second auxiliary conveyor belt at a height substantially equal to said at least one second height.

More preferably, removing said service fabric from said at least one second tread band comprises:
- detaching said service fabric from a free end portion of a head portion of said at least one second tread band to form a detached end edge of said service fabric;
- transferring said head portion onto said work plane;
- completing the detachment of said service fabric from said at least one second tread band while said at least one second tread band is transferred from said work plane onto said at least one second auxiliary conveyor belt.

Advantageously, the operator repeats the few manual operations carried out on the first tread band on all the other tread bands, then allowing such other tread bands to be processed automatically as occurs for the first tread band.

In preferred embodiments, completing the detachment of said service fabric from said at least one second tread band comprises:
- transferring said head portion from said work plane onto said at least one second auxiliary conveyor belt due to the pulling action of said detached end edge;
- moving said at least one second auxiliary conveyor belt;
- detaching said service fabric due to the movement of said at least one second auxiliary conveyor belt.

Preferably, transferring said head portion onto said work plane comprises:
- positioning said head portion on said work plane so that said free end portion projects cantilevered from said work plane;
- pulling said detached end edge of said service fabric.

Preferably, moving in sequence said first tread band and said at least one second tread band from said first auxiliary conveyor belt and from said at least one second auxiliary conveyor belt, respectively, towards the forming support comprises:
- transferring in sequence said first tread band and said at least one second tread band on at least one feeding conveyor belt;
- transferring in sequence said at least one first tread band and said at least one second tread band from said at least one feeding conveyor belt on the forming support.

Advantageously, said at least one feeding conveyor belt can act, in an initial part of the method and in addition to the aforementioned auxiliary conveyor belts, as a further collection member of a respective tread band, in this way allowing a greater number of tread bands without service fabric to be collected, with obvious advantages in terms of process cost-effectiveness.

More preferably, transferring in sequence said first tread band and said at least one second tread band on said at least one feeding conveyor belt comprises:
- transferring in sequence said first tread band on a first feeding conveyor belt;
- transferring said first tread band from said first feeding conveyor belt to at least one second feeding conveyor belt arranged between said first feeding conveyor belt and the forming support;
- transferring said at least one second tread band on said first feeding conveyor belt.

The Applicant has verified that the provision of two feeding conveyor belts makes it possible to achieve an optimal compromise between the aforementioned advantages in terms of process cost-effectiveness and bulk in plan of the apparatus.

Preferably, transferring said at least one second tread band onto said first feeding conveyor belt is carried out at least in part simultaneously with transferring said first tread band from said first feeding conveyor belt to said at least one second feeding conveyor belt.

Preferably, transferring said at least one second tread band onto said at least one second feeding conveyor belt is carried out at least in part simultaneously with transferring said first tread band from said at least one second feeding conveyor belt to the forming support.

It is thus possible, if desired, to temporally juxtapose at least part of the aforementioned operations in order to obtain an advantageous reduction of the cycle time.

Preferably, before transferring in sequence said first tread band and said at least one second tread band from said at least one feeding conveyor belt onto the Forming support, said first auxiliary conveyor belt and said at least one second auxiliary conveyor belt are respectively brought to a predetermined height. Such a height is preferably predetermined depending on the height at which said at least one feeding conveyor belt is located.

Preferably, each of said auxiliary conveyor belts is substantially parallel to the other auxiliary conveyor belts.

Preferably, each of said auxiliary conveyor belts is movable upwards/downwards, with respect to a recess of a floor, integrally with the other auxiliary conveyor belts. The upward/downward movement of all of the auxiliary conveyor belts can thus be carried out through a single motorisation.

Preferably, each of said auxiliary conveyor belts is movable along a longitudinal direction independently from the other auxiliary conveyor belts. In this way the greatest flexibility of management of the individual auxiliary conveyor belts is obtained, which allows an advantageous optimisation of the time.

In preferred embodiments thereof, said auxiliary collection device comprises a plurality of juxtaposed pressing rollers, each pressing roller of said plurality of pressing rollers being operatively associated with a respective auxiliary conveyor belt. Such rollers make it possible to consolidate the tread band on the respective auxiliary conveyor belt, thus making easier the dragging of the tread band due to the movement of the auxiliary conveyor belt.

Preferably, said separation device can be controlled to position a work plane thereof at a plurality of different heights depending on the height of each tread band of said plurality of tread bands.

More preferably, said auxiliary collection device can be controlled to position each of said auxiliary conveyor belts at a respective height depending on the height of said work plane.

The upward/downward movement of the auxiliary conveyor belts is thus automatic once the operator has positioned the aforementioned work plane at the tread band to be processed.

Preferably, said separation device comprises a pulling device for pulling a detached end edge of said service fabric.

More preferably, said pulling device is fixedly associated with said work plane.

Even more preferably, said pulling device comprises:
a pair of rollers;
a member for controlling the rotation of at least one roller of said pair of rollers;
a contrast roller movable on command between an operative position in which said contrast roller is in a position proximal to said pair of rollers and cooperates with said pair of rollers to pull said detached end edge and a rest position in which said contrast roller is in a position distal from said pair of rollers.

Preferably, it is foreseen to use a guiding and centring device for guiding and centring said tread bands, wherein said guiding and centring device is operatively arranged between said auxiliary collection device and said feeding device.

In preferred embodiments, said feeding device comprises a first feeding conveyor belt in a position proximal to said auxiliary collection device and at least one second feeding conveyor belt arranged downstream of said first feeding conveyor belt with respect to said auxiliary collection device.

Preferably, said first feeding conveyor belt and at least one second feeding conveyor belt are movable along a longitudinal direction independently from one another. This contributes to having a great flexibility of management and an advantageous optimisation of the time.

BRIEF DESCRIPTION OF THE DRAWINGS

Further characteristics and advantages of the present invention will become clearer from the following detailed description of preferred embodiments thereof, made with reference to the attached drawings. In such drawings.

DETAILED DESCRIPTION OF THE INVENTION

Figure 1:
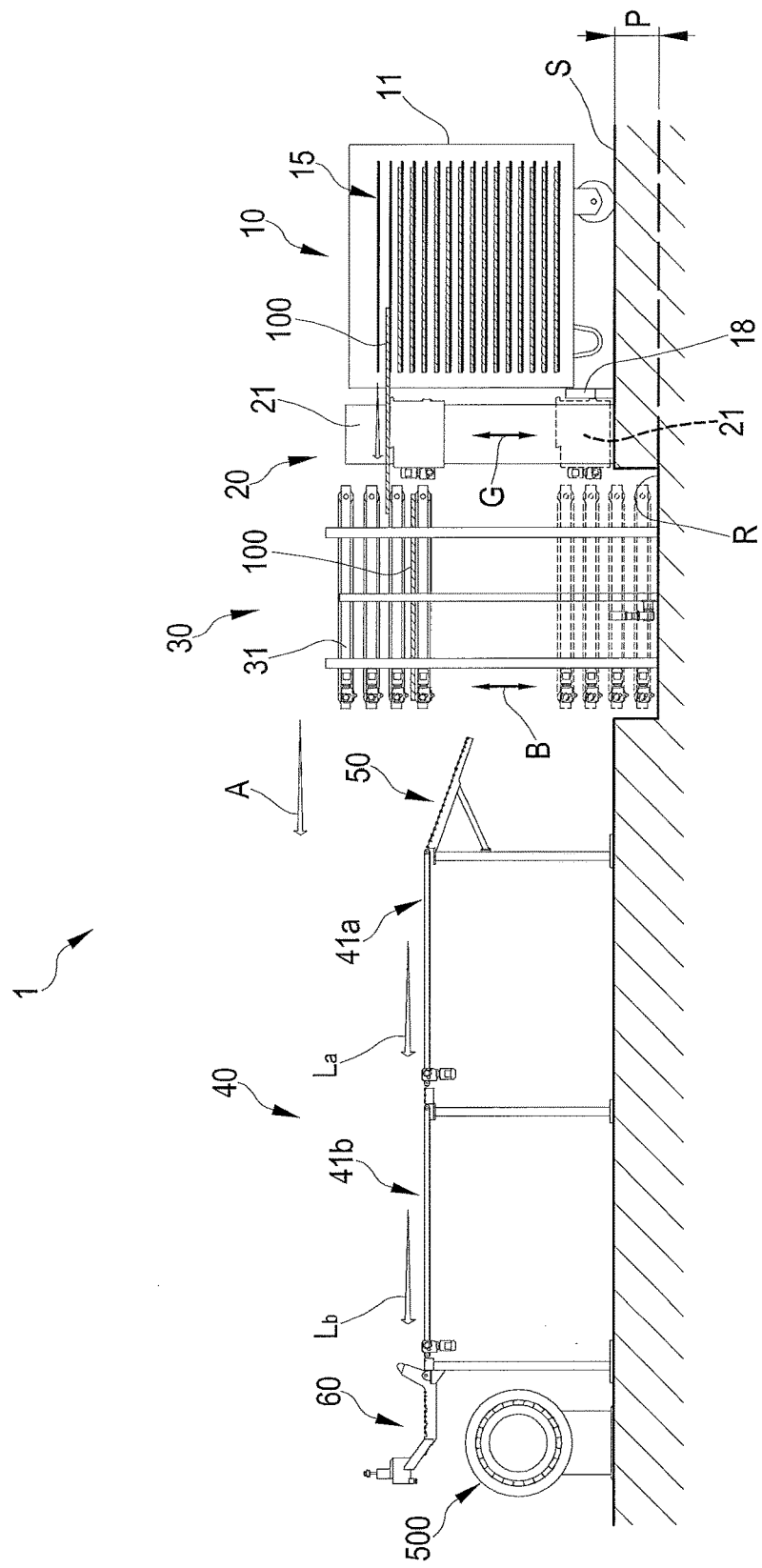
FIG. 1 is a schematic side view of an exemplifying embodiment of an apparatus for feeding a plurality of tread bands in a process for building tyres for vehicle wheels, in accordance with the present invention, the apparatus being illustrated in an operative configuration thereof.

In FIG. 1, reference numeral 1 is used to wholly indicate an exemplifying embodiment of an apparatus in accordance with the present invention. The apparatus 1 is used to feed a plurality of tread bands, indicated with 100, towards a forming support, indicated with 500, in a process for building tyres for vehicle wheels.

Preferably (but not exclusively), the aforementioned tyres are intended to be mounted on heavy load vehicle wheels, as defined at the beginning of this description.

The feeding direction of the tread bands 100 towards the forming support 500 is indicated in FIGS. 1-4 by the arrow A.

For the sake of clarity of illustration, in FIG. 1 reference numeral 100 is associated with just some of the illustrated tread bands.

The forming support 500 is preferably a substantially cylindrical drum. As illustrated in detail in FIG. 4, the forming support 500 can be driven in rotation by a suitable motor group 501 through a suitable motion transfer member 502. In the specific example herein illustrated, the motion transfer member 502 which is used is a belt.

The tread bands 100 are preferably made through an extrusion process of a compound made from elastomeric material.

In the specific case in which the tyre is intended to be mounted on a heavy load vehicle wheel, each tread band 100 preferably has the following dimensions:
length comprised between about 1.5 meters and about 5 meters, preferably between about 2 meters and about 4 meters, more preferably between about 2.5 meters and about 3.5 meters;
width comprised between about 100 mm and about 500 mm, preferably between about 130 mm and about 350 mm.

Each tread band 100 also has a weight between about 15 kg and about 40 kg, preferably between about 20 kg and about 35 kg.

Figure 2:
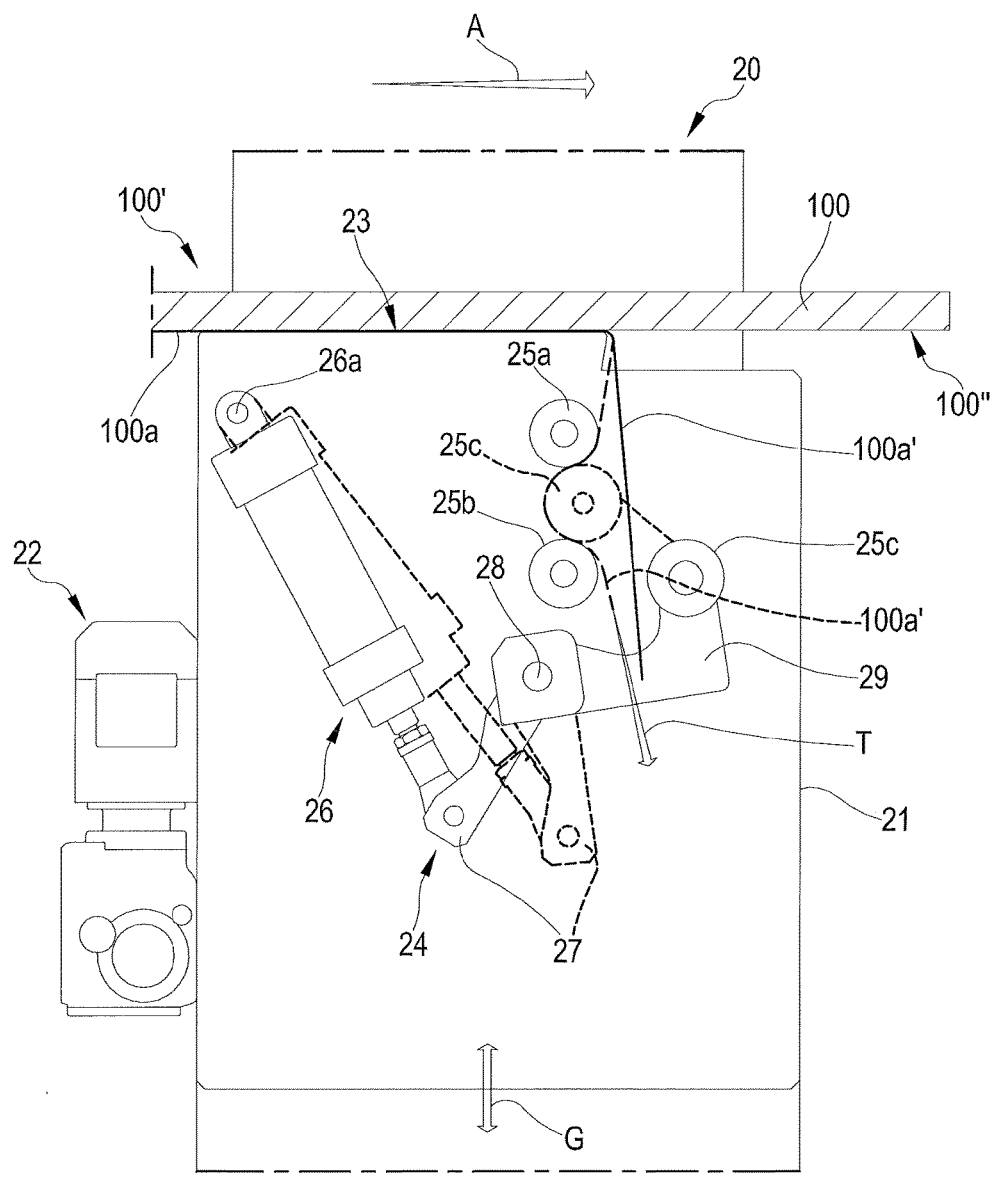
FIG. 2 is an schematic enlarged view of a detail of the apparatus of FIG. 1 in the aforementioned operative configuration.

A service fabric 100a, illustrated only in FIG. 2 by the thicker line, is attached by adhesivity on the side of each tread band 100 (corresponding to the radially inner surface of the tread band 100 when it is deposited onto the forming support 500). Such a service fabric 100a is preferably made from plastic material, more preferably polythene. It is used to preserve and protect the adhesivity of the aforementioned side, such adhesivity being necessary to then obtain a stable adhesion of the tread band 100 to the belt structure of the tyre being processed.

Figure 3:
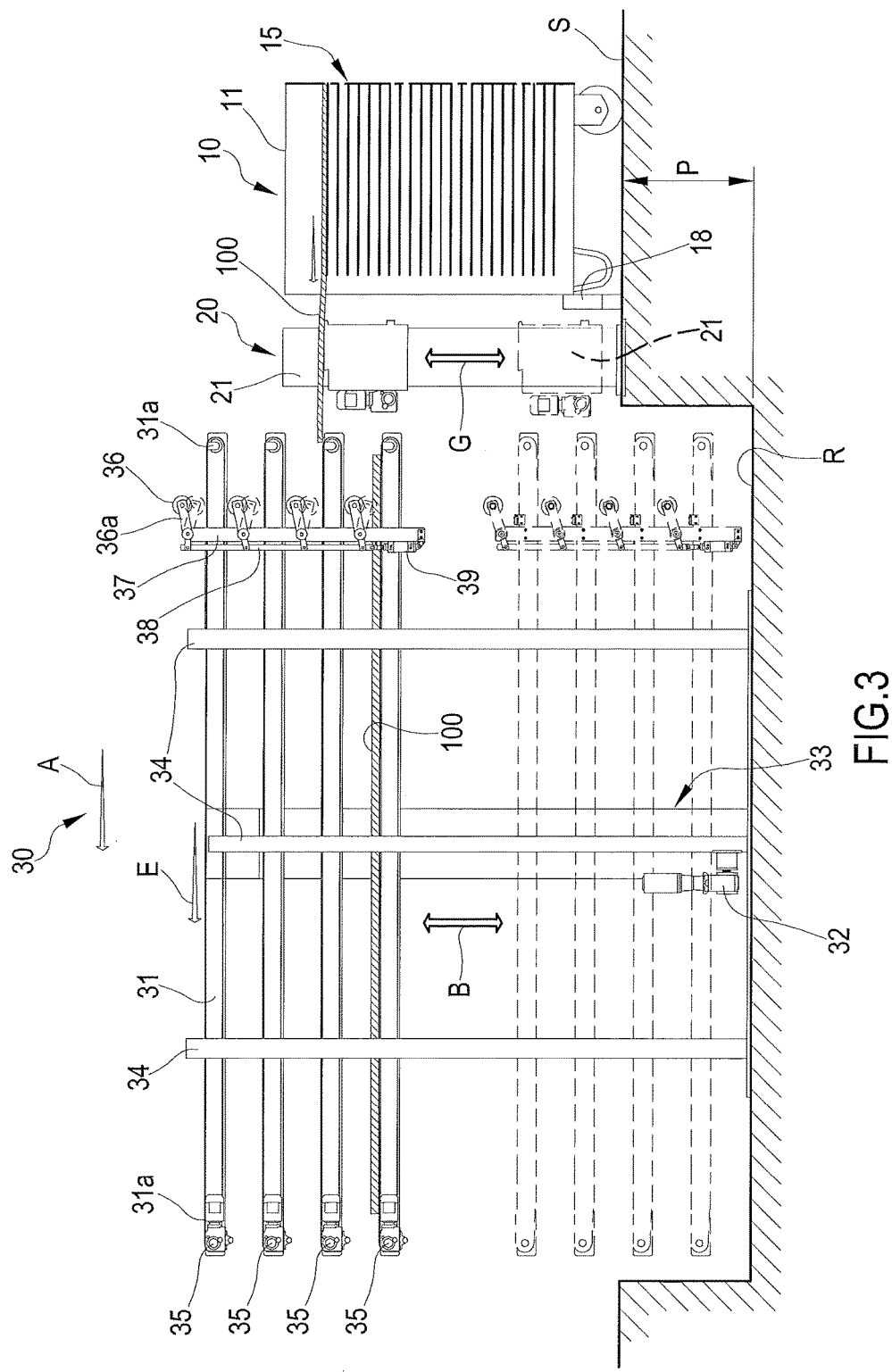
FIG. 3 is a schematic and enlarged side view of a first portion of the apparatus of FIG. 1 in the aforementioned operative configuration.

With reference to FIGS. 1 and 3, the apparatus 1 comprises a storage device 10 of the aforementioned tread bands 100, each tread band 100 being provided with a respective service fabric 100a.

The storage device 10 in particular comprises a trolley 11 movable on the floor S. The trolley 11 is provided with a plurality of shelves 15 arranged at different heights with respect to the floor S. Each shelf 15 is intended to support a respective tread band 100.

For the sake of clarity of illustration, reference numeral 15 is associated with just some of the aforementioned shelves. In FIG. 1 each shelf 15 has a tread band 100 arranged thereon, while in FIG. 3 for the sake of simplicity of illustration a tread band 100 is illustrated just at the highest shelf 15 among those illustrated.

As illustrated in FIG. 1, each shelf 15 is hinged to the trolley 11 at a respective hinge (not illustrated) suitable for allowing the "book-style" opening of the shelf 15.

Each shelf 15 takes up the open position after the tread band 100 supported by it has been picked up, in order to then be able to pick up the tread band 100 supported by the shelf 15 immediately below.

Again with reference to FIGS. 1 and 3, downstream of the storage device 10, with reference to the feeding direction A, the apparatus 1 comprises a separation device 20 for separating the service fabric 100a from each tread band 100 picked up from the storage device 10.

The separation device 20 comprises a slide 21, better illustrated in FIG. 2. Such a slide is movable along a vertical direction upon command of a motor group 22.

The vertical movement of the slide 21 is illustrated in FIGS. 1-3 by the double arrow G. FIGS. 1 and 3 also illustrate, with a broken line, the slide 21 in a different operative position thereof.

As illustrated in FIG. 2, a work plane 23 is defined on the upper surface of the slide 21. The work plane 23 is intended to support each tread band 100 picked up from the storage device 10 in the removal operations of the service fabric 100a.

Due to the command imparted by the motor group 22, the work plane 23 can be positioned at a plurality of different heights, such heights being selected depending on the height of the tread band 100 that it is wished to pick up from the storage device 10.

A pulling device 24 of the service fabric 100a is mounted on the slide 21. The pulling device 24 is thus movable along the vertical direction integrally with the work plane 23.

In the exemplifying embodiment herein illustrated, the pulling device 24 comprises a pair of rollers 25a, 25b, both mounted in a fixed position on the slide 21. At least one of the aforementioned rollers 25a, 25b is a motorised roller. The pulling device 24 further comprises an idle contrast roller 25c. The contrast roller 25c is movable between an operative position in which it is in a position proximal to the rollers 25a, 25b (such a position is illustrated with a broken line in FIG. 2) and a rest position in which it is in a position distal from the rollers 25a, 25b (such a position is illustrated with a solid line in FIG. 2). In its operative position, the contrast roller 25c is at least partially arranged between the rollers 25a and 25b in the vertical direction and cooperates with them to pull the service fabric 100a from the lower side of the tread band 100, as will be illustrated hereafter.

The movement of the contrast roller 25c between the aforementioned operative position and rest position is obtained upon command of an actuator 26 which, in the exemplifying embodiment illustrated here, is of the pneumatic type. The actuator 26 is pivoted, at one end thereof, to the slide 21 at a hinge 26a and, at the opposite end thereof, to an end of a lever 27. The other end of the lever 27 is pivoted to the slide 21 at a hinge 28. The hinge 28 is also pivoted to an end of another lever 29 fixedly connected to the lever 27, whereas the opposite end of the lever 29 is coupled with the contrast roller 25c.

The assembly comprising the actuator 26 and the levers 27 and 29 thus defines an articulated kinematic mechanism capable of being moved between a rest configuration, illustrated with a solid line in FIG. 2 and at which the contrast roller 25c is in the rest position thereof, and an operative configuration, illustrated with a broken line in FIG. 2 and at which the contrast roller 25c is in the operative position thereof. Starting from the rest configuration, the activation of the actuator 26 causes a rotation of the lever 27 about the hinge 28. Consequently, the lever 29 also rotates about the hinge 28 and moves the contrast roller 25c from the rest position to the operative position thereof. The subsequent deactivation of the actuator 26, on the other hand, causes an opposite movement of the levers 27 and 29 about the hinge 28 and, consequently, the movement of the contrast roller 25c from the operative position to the rest position thereof.

As illustrated in FIGS. 1 and 3, the apparatus 1 comprises, upstream of the separation device 20, a stop element 18 intended to define the position at which the storage device 10 must be positioned in order to be able to proceed with the operations of picking up the tread bands 100 and removing the service fabric 100a.

Again with reference to FIGS. 1 and 3, downstream of the separation device 20, with reference to the feeding direction A, the apparatus 1 comprises an auxiliary collection device 30 for collecting the tread bands 100 picked up from the storage device 10 and from which the service fabric 100a has been removed.

The auxiliary device 30 is preferably housed in a recess R of the floor S having a predetermined depth P. Such an auxiliary device 30 comprises a plurality of juxtaposed auxiliary conveyor belts 31 (four conveyor belts 31 in the example illustrated here) which are movable integrally with one another along the vertical direction upon command of a suitable motor group 32 through a suitable motion transfer device 33 (FIG. 3).

For the sake of clarity of illustration, in FIGS. 1 and 3 reference numeral 31 is associated with just one of the aforementioned auxiliary conveyor belts, the one arranged at the top.

The movement of the auxiliary conveyor belts 31 along the vertical direction is illustrated in FIGS. 1 and 3 by the double arrow B. In such figures the auxiliary conveyor belts 31 are also illustrated with a broken line in a different operative position thereof.

Due to the command imparted by the motor group 32, each auxiliary conveyor belt 31 can be positioned at a plurality of different heights depending on the height at which the work plane 23 is positioned and, therefore, on the height of the tread band 100 that it is wished to pick up from the storage device 10.

The auxiliary conveyor belts 31 are substantially parallel to one another and are supported by a frame comprising a plurality of uprights 34.

Each auxiliary conveyor belt 31 is defined by a respective belt-shaped element closed in a loop around two opposite support rollers 31a. For the sake of clarity of illustration, in FIG. 3 reference numeral 31a is associated with just one pair of support rollers.

The rotation of the aforementioned belt-shaped element around the support rollers 31a causes the movement of the auxiliary conveyor belts in the longitudinal direction, indicated in FIG. 3 by the arrow E, and thus the movement of the tread bands 100 along the feeding direction A. In order to have each auxiliary conveyor belt 31 moved in the longitudinal direction independently from the other auxiliary conveyor belts 31, each auxiliary conveyor belt 31 is associated with a respective motor member 35.

The auxiliary device 30 further comprises, at an end thereof proximal to the separation device 20, a plurality of juxtaposed pressing rollers 36, each pressing roller 36 being juxtaposed over a respective auxiliary conveyor belt 31 and being movable between a rest position, illustrated with a solid line in FIG. 3, in which the pressing roller 36 is in a position that is distal from the respective auxiliary conveyor belt 31 and an operative position, illustrated with a broken line in FIG. 3, in which the pressing roller 36 is in a position proximal to the respective auxiliary conveyor belt 31. For the sake of clarity of illustration, in FIG. 3 reference numeral 36 is associated with just one of the aforementioned pressing rollers.

In the exemplifying embodiment illustrated here, each pressing roller 36 is associated with an end of a respective arm 36a. All of the arms 36a are pivoted to an upright 37 which is fixedly associated with the auxiliary conveyor belts 31. The arms 36a are also associated, at an end opposite to the one in which the pressing rollers 36 are mounted, with a shaft 38 movable along the vertical direction upon the command of a suitable motor member 39. For the sake of clarity of illustration, reference numeral 36a is associated just with one of the aforementioned arms.

Due to the movement of the shaft 38 all of the arms 36a rotate as a unit with each other around the respective pivoting axes to the upright 37, thus moving the pressing rollers 36 from their rest position to their operative position and vice-versa.

As illustrated in FIG. 1, the apparatus 1 comprises, downstream of the auxiliary device 30, a feeding device 40 configured to transfer on the forming support 500 each of the tread bands 100 coming from the auxiliary device 30.

The feeding device 40 comprises a pair of feeding conveyor belts 41a, 41b that are substantially identical, arranged in series along the feeding direction A.

The feeding conveyor belt 41a is arranged in a position proximal to the auxiliary device 30. The feeding conveyor belt 41b is arranged downstream of the feeding conveyor belt 41a along the feeding direction A; it is thus in a position proximal to the forming support 500.

Each feeding conveyor belt 41a, 41b is defined by a respective belt-shaped element closed in a loop around two opposite support rollers 45a, 45b. The rotation of the aforementioned belt-shaped element around the respective support rollers 45a, 45b causes the movement of the respective feeding conveyor belt 41a, 41b in the longitudinal direction, indicated in FIG. 4 by the arrows La and Lb, respectively, and thus the movement of the tread bands 100 along the feeding direction A towards the forming support 500.

The movement of each of the feeding conveyor belts 41a, 41b in the longitudinal direction takes place upon command of a respective motor member 42a, 42b. The feeding conveyor belts 41a, 41b are thus movable in the longitudinal direction independently from one another.

The feeding conveyor belts 41a, 41b are supported by a frame 43 comprising a plurality of uprights 43a.

A guiding and centring device 50 for guiding and centring the tread bands 100 coming from the auxiliary device 30 is provided between the auxiliary device 30 and the feeding conveyor belt 41a. Such a guiding and centring device 50 is fixedly associated with the frame 43 and comprises a plurality of rollers 51 arranged parallel to one another with respective rotation axes perpendicular to the feeding direction A.

Downstream of the feeding conveyor belt 41b a deposition device 60 for depositing the tread bands 100 onto the forming support 500 is provided. Such a deposition device 60 is pivoted to an end of the frame 43 proximal to the forming support 500 and comprises a plurality of rollers 61 arranged parallel to one another with respective rotation axes perpendicular to the feeding direction A.

The deposition device 60 is movable, upon command of a suitable motor member 62, between a rest position (illustrated in FIG. 1 and with a broken line in FIG. 4) in which it is in a position distal from the forming support 500 and an operative position (illustrated with a solid line in FIG. 4) in which it is in a position proximal to the forming support 500.

A preferred embodiment of a method for feeding a plurality of tread bands 100 on the forming support 500 in a process for building tyres for vehicle wheels, preferably for heavy load vehicle wheels, in accordance with the present invention, will be now described. Such a process can be carried out with the apparatus 1 described above.

With reference to FIG. 1, the tread bands 100 are initially stored in the storage device 10, each tread band 100 with the respective service fabric 100a being positioned on a respective shelf 15 of the trolley 11.

The tread bands 100 are sequentially picked up from the respective shelves 15 and transferred onto respective auxiliary conveyor belts 31 of the auxiliary device 30.

Once a tread band 100 has been picked up from a shelf 15 of the storage device 10, such a shelf is made to rotate around the respective hinge and brought to an open position so as to allow the operator to pick up the tread band 100 arranged on the shelf 15 immediately below.

During the movement between storage device 10 and auxiliary device 30 each tread band 100 is removed of the respective service fabric at the separation device 20.

Once the auxiliary device 30 has been filled with a plurality of tread bands 100 deprived of service fabric 100a, the tread bands 100 are sequentially transferred from the auxiliary device 30 to the forming support 500 passing in order through the guiding and centring device 50, the feeding device 40 and the deposition device 60.

With particular reference to FIGS. 1 and 3, the transfer of each tread band 100 from the storage device 10 to the separation device 20 initially comprises the positioning of the trolley 11 in the respective parking area close to the separation device 20. In particular, the position of the trolley 11 is determined by the abutment thereof against the stop element 18.

The operator then adjusts the height of the work plane 23 so that it is brought to a height substantially equal to the height of the shelf 15 from which it is wished to pick up the tread band 10. Such adjustment is carried out by commanding a suitable activation software of the motor 22, which in turn commands the upward/downward movement of the slide 21.

Once the work plane 23 has been positioned at the desired height, the operator activates the auxiliary device 30. In particular, once the height of the work plane 23 has been detected, the automatic upward/downward movement of the auxiliary conveyor belts 31 is commanded until an auxiliary conveyor belt 31 is positioned at the same height as the work plane 23.

With reference to FIGS. 1-3, the operator then takes care of manually picking up a head portion 100' (FIG. 2) of the tread band 100, pulling it towards the separation device 20. Such a head portion 100' in particular is laid on the work plane 23, with a free end portion 100" which projects cantilevered from the work plane 23. Before, after or during the transferring of the head portion 100' on the work plane 23, the operator manually detaches the service fabric 100a from the end portion 100", thus forming a detached end edge 100a' of service fabric 100a. Such a detached end edge 100a' preferably has a length of 5-10 cm.

Such a detached end edge 100a' is then brought close to the rollers 25a. By acting on a safety pedal, the operator actuates the actuator 26 which in turn commands the movement of the contrast roller 25c from the work position to the operative position thereon, illustrated in FIG. 2 with a broken line. At this point, the detached end edge 100a' of service fabric 100a is captured between the rollers 25a, 25b and the contrast roller 25c. Therefore, once the motorisation of the roller 25a and/or 25b is activated, the detached end edge 100a' is pulled along the direction indicated in FIG. 2 with T. Due to this pulling, the tread band is pushed along the feeding direction A and, simultaneously, the service fabric 100a is automatically detached from the portion of tread band 100 that each time leaves the work plane 23. This process continues until the end portion 100" of the tread band 100 reaches the auxiliary conveyor belt 31. At this point the motor member 35 is activated, the auxiliary conveyor belt 31 is moved along its longitudinal direction and the tread band 100 is pulled on the auxiliary conveyor belt 31 due to the friction between auxiliary conveyor belt 31 and tread band 100. In order to increase the friction between auxiliary conveyor belt 31 and tread band 100 the pressing rollers 36a are brought into their operative position (illustrated with a broken line in FIG. 3). The detachment of the service fabric 100a from the tread band 100 then proceeds automatically until the tread band 100 is entirely transferred on the auxiliary conveyor belt 31.

Once the transferring of the tread band 100 on the auxiliary conveyor belt 31 is completed, the operator goes back towards the trolley 11 to proceed with the transferring operations of a second tread band 100 from a second shelf 15 of the trolley 11 on the work plane 23 of the separation device 20 and, from here, to a second auxiliary conveyor belt 31 of the auxiliary device 30, with simultaneous removal of the service fabric 100a from the second tread band. The aforementioned transferring comprises the positioning of the work plane 23 at a second height substantially equal to that at which the second shelf 15 is located, the automatic positioning of the second auxiliary conveyor belt 31 at such a second height and the repetition of the operations described above.

FIGS. 1 and 3 illustrate an operative configuration in which a first tread band 100 has been entirely transferred onto a first auxiliary conveyor belt 31 and another tread band 100 is being transferred from a shelf 15 immediately below the one that supported the first tread band 100 to an auxiliary conveyor belt 31 immediately above the aforementioned first auxiliary conveyor belt 31.

The operations described above are repeated until respective tread bands 100 are loaded on all of the auxiliary conveyor belts 31 of the auxiliary device 30.

Thereafter, the aforementioned first tread band 100 is transferred, due to the movement of the auxiliary conveyor belt 31, on the feeding device 40.

Such transferring comprises the prior positioning of the aforementioned first auxiliary conveyor belt 31 at a height corresponding to that of the free end of the guiding and centring device 50. The first tread band 100 thus passes through the guiding and centring device 50 and is transferred at first above the first feeding conveyor belt 41a and then above the second feeding conveyor belt 41b. In such an operative stage the feeding conveyor belts 41a and 41b are moved along the respective longitudinal directions La and Lb. The tread band 100 is then transferred on the deposition device 60, which is brought into its operative position indicated with a solid line in FIG. 4 and takes care of depositing the tread band 100 on the forming support 500 while the latter rotates about its rotation axis, thus building a first crown structure.

During or after the transferring of the tread band 100 on the feeding conveyor belt 41b, before or during the deposition of the aforementioned tread band 100 on the forming support 500, the process continues with the loading on the feeding conveyor belt 41a of a second tread band 100 and with the subsequent depositing of the latter on the forming support (after removal of the crown structure which has been built thereon previously), repeating the operations described above with reference to the first tread band 100.

The aforementioned operations are repeated for all of the tread bands provided on the auxiliary device 30.

Figure 4:
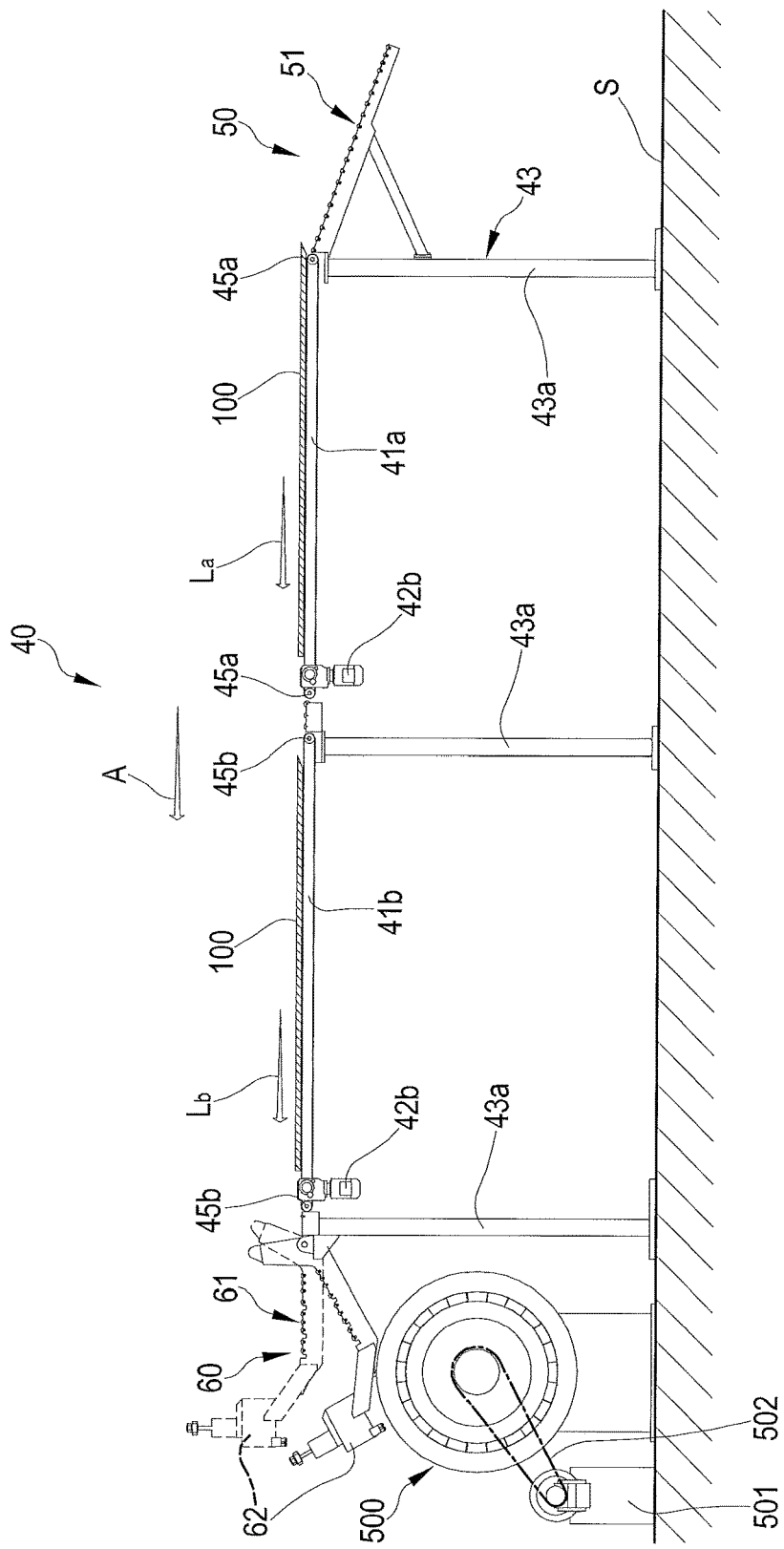
FIG. 4 is a schematic and enlarged side view of a second portion of the apparatus of FIG. 1 in a different operative configuration.

FIG. 4 shows an operative configuration in which a first tread band is arranged on the feeding conveyor belt 41b and a second tread band is arranged on the feeding conveyor belt 41a.

Through the method described above it is possible to reach an operative configuration in which on each feeding conveyor belt 41a, 41b and on each auxiliary conveyor belt 31 a respective tread band 100 is loaded. There is thus the possibility of storing a plurality (six in the exemplifying embodiment described here and illustrated in the drawings) of tread bands 100 deprived of service fabric 100a before proceeding with the depositing of each of them on the forming support 500. It is thus possible to have an advantageous concentration of the operations of preparing and loading the tread bands 100 on the apparatus 1 in a single production stage, thus leaving the operator a period of "free time" that is sufficiently long to allow him to dedicate himself to other operations.

Of course, a man skilled in the art can bring further modifications and variants to the invention described above in order to satisfy specific and contingent application requirements, said variants and modifications in any case being within the scope of protection as defined by the following claims.

The invention claimed is:

1. A method for feeding a plurality of tread bands in a process for building tyres for vehicle wheels, comprising:
   providing an auxiliary collection device comprising a plurality of juxtaposed auxiliary conveyor belts and a plurality of juxtaposed pressing rollers, each pressing roller of said plurality of pressing rollers being juxtaposed over a respective auxiliary conveyor belt of said plurality of auxiliary conveyor belts and movable between a respective rest position and a respective operative position via a respective arm of a plurality of arms pivotally connected to an upright fixedly associated with the plurality of juxtaposed auxiliary conveyor belts;
   providing a plurality of vertically stacked tread bands, each tread band comprising, on a side thereof, a service fabric, wherein each tread band is positioned at a different height from the other tread bands in a respective shelf of a trolley;
   positioning a first auxiliary conveyor belt of the auxiliary collection device at a first height corresponding to a height of a first tread band of said plurality of tread bands, wherein prior to positioning the first auxiliary conveyor belt, adjusting a work plane of a separation device to a first plane height corresponding to the first height, the separation device comprising a slide movable along a vertical direction and being configured to separate each tread band from its service fabric;

rotating the plurality of arms pivotally connected to the upright together as a unit thereby moving the plurality of pressing rollers from their respective rest positions to their respective operative positions so that said first tread band is pressed;

removing a first service fabric from said first tread band while said first tread band is transferred onto said first auxiliary conveyor belt at said first height;

positioning a second auxiliary conveyor belt of said auxiliary collection device at a second height corresponding to a height of a second tread band of said plurality of tread bands, wherein said second height is offset from said first height by a vertical distance corresponding to a distance between directly adjacent shelves, wherein prior to positioning the second auxiliary conveyor belt, adjusting the work plane to a second plane height corresponding to the second height;

rotating the plurality of arms pivotally connected to the upright together as a unit thereby moving the plurality of pressing rollers from their respective rest positions to their respective operative positions so that said second tread band is pressed;

removing a second service fabric from said second tread band while said second tread band is transferred onto said second auxiliary conveyor belt at said second height; and moving, in sequence, said first tread band and said second tread band from said first auxiliary conveyor belt and from said second auxiliary conveyor belt, respectively, toward a forming support.

2. The method according to claim 1, wherein said removing said first service fabric from said first tread band comprises:

detaching said first service fabric from a free end portion of a head portion of said first tread band to form a detached end edge of said first service fabric;

transferring said head portion of said first tread band onto said work plane; and completing detachment of said first service fabric from said first tread band while said first tread band is transferred from said work plane onto said first auxiliary conveyor belt.

3. The method according to claim 2, wherein said completing detachment of said first service fabric from said first tread band comprises:

transferring said head portion of said first tread band from said work plane onto said first auxiliary conveyor belt due to a pulling action exerted on said detached end edge;

moving said first auxiliary conveyor belt; and detaching said first service fabric due to the movement of said first auxiliary conveyor belt.

4. The method according to claim 1, wherein said removing said second service fabric from said second tread band comprises:

detaching said second service fabric from a free end portion of a head portion of said second tread band to form a detached end edge of said second service fabric;

transferring said head portion of said second tread band onto said work plane; and completing detachment of said second service fabric from said second tread band while said second tread band is transferred from said work plane onto said second auxiliary conveyor belt.

5. The method according to claim 4, wherein said completing detachment of said second service fabric from said second tread band comprises:

transferring said head portion of said second tread band from said work plane onto said second auxiliary conveyor belt due to a pulling action on said detached end edge;

moving said second auxiliary conveyor belt; and detaching said second service fabric due to movement of said second auxiliary conveyor belt.

6. The method according to claim 2, wherein said transferring said head portion of said first tread band onto said work plane comprises:

positioning said head portion of said first tread band on said work plane so that said free end portion projects cantilevered from said work plane; and pulling said detached end edge of said first service fabric.

7. The method according to claim 1, wherein said moving, in sequence, said first tread band and said second tread band from said first auxiliary conveyor belt and from said second auxiliary conveyor belt, respectively, toward the forming support comprises:

transferring, in sequence, said first tread band and said second tread band onto a feeding conveyor belt; and transferring, in sequence, said first tread band and said second tread band from said feeding conveyor belt onto the forming support.

8. The method according to claim 7, wherein said transferring, in sequence, said first tread band and said second tread band onto said feeding conveyor belt, comprises:

transferring, in sequence, said first tread band onto a first feeding conveyor belt;

transferring said first tread band from said first feeding conveyor belt to a second feeding conveyor belt arranged between said first feeding conveyor belt and the forming support; and transferring said second tread band onto said first feeding conveyor belt.

9. The method according to claim 8, wherein the step of transferring said second tread band onto said first feeding conveyor belt is carried out, at least in part, simultaneously with the step of transferring said first tread band from said first feeding conveyor belt to said second feeding conveyor belt.

10. The method according to claim 8, comprising transferring said second tread band from said first feeding conveyor belt to said second feeding conveyor belt at least in part simultaneously with transferring said first tread band from said second feeding conveyor belt to the forming support.

11. The method according to claim 7, comprising, before said transferring in sequence said first tread band and said second tread band from said feeding conveyor belt onto the forming support, bringing said first auxiliary conveyor belt and said second auxiliary conveyor belt, respectively, to a predetermined height based on a height at which said feeding conveyor belt is located.

* * * * *